Oct. 6, 1942.  W. H. BACHMANN  2,297,862
SWITCH BOX
Filed Aug. 30, 1939  2 Sheets-Sheet 1
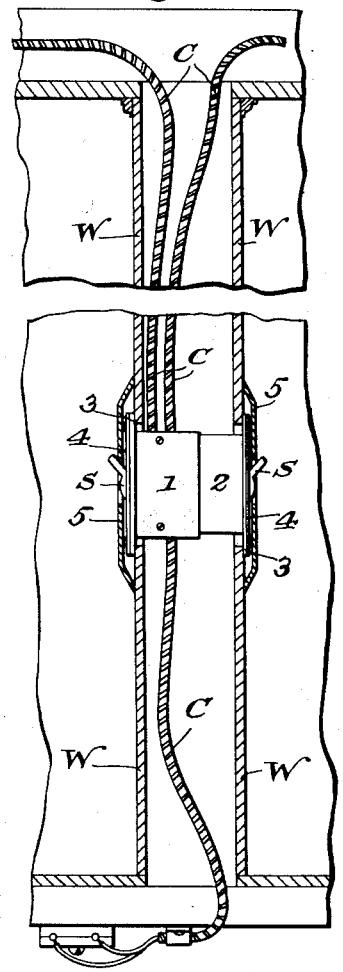
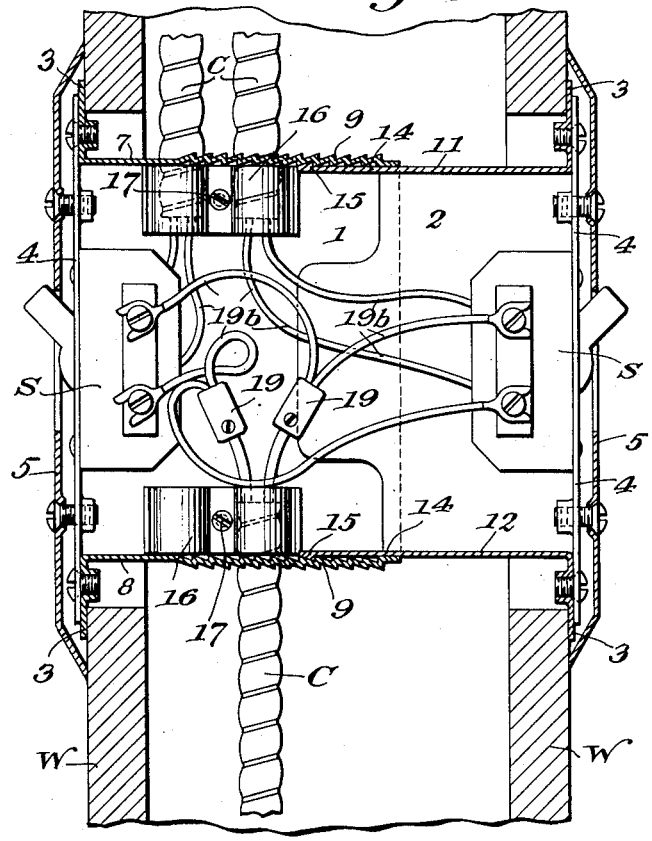
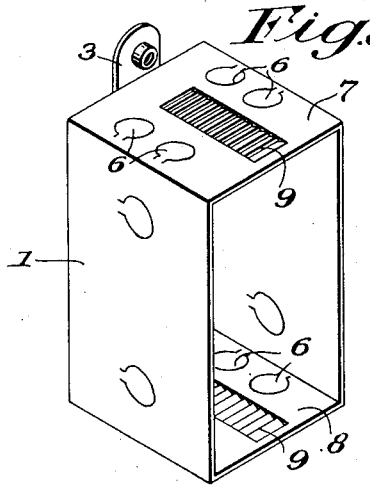
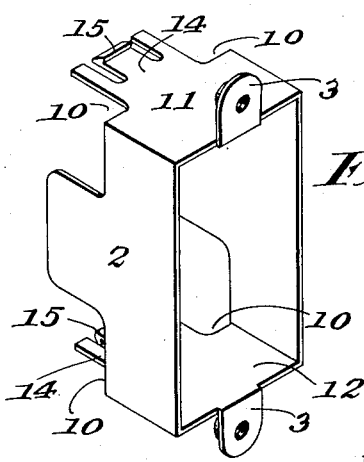
INVENTOR.
Walter H. Bachmann
BY Spear, Rawlings + Spear
ATTORNEYS.

Oct. 6, 1942.  W. H. BACHMANN  2,297,862
SWITCH BOX
Filed Aug. 30, 1939  2 Sheets-Sheet 2
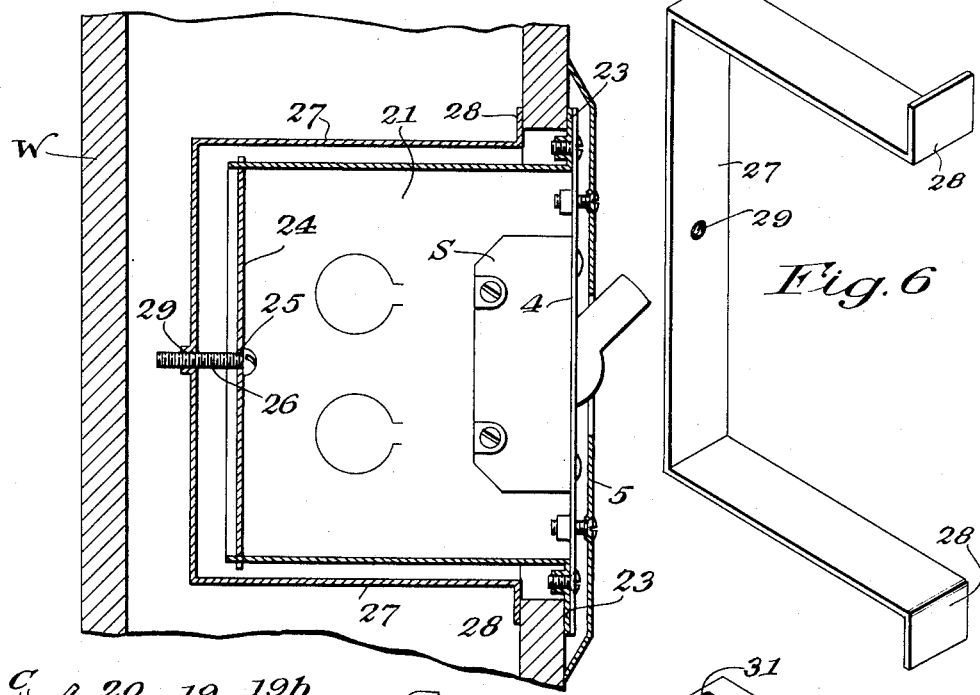
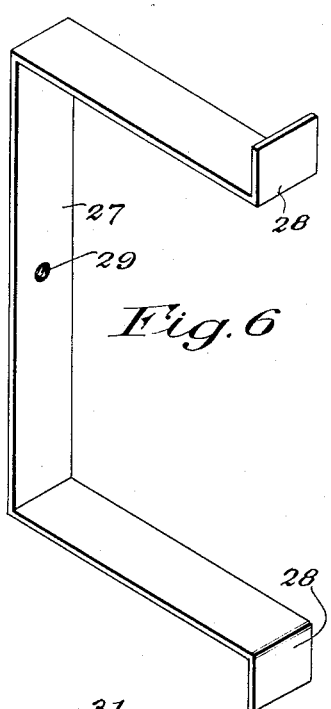
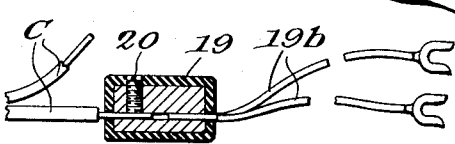
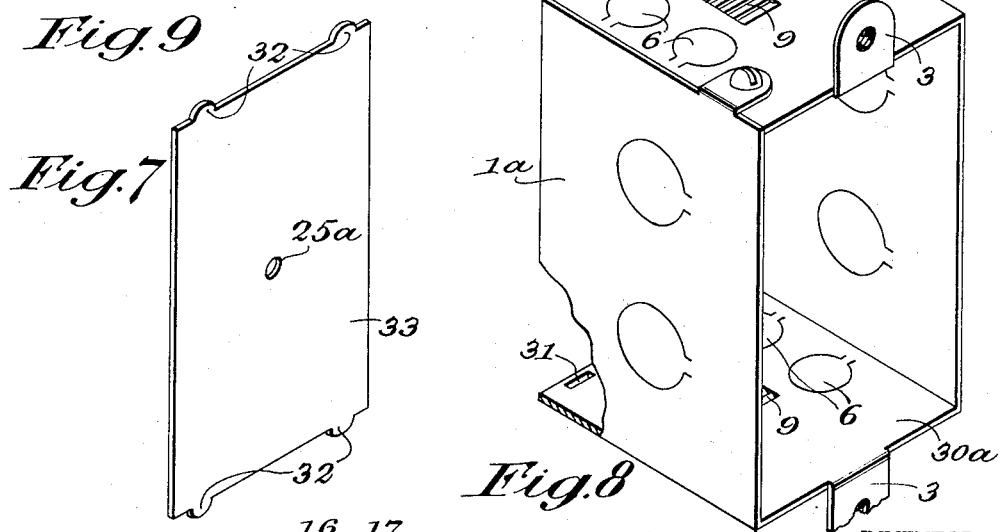
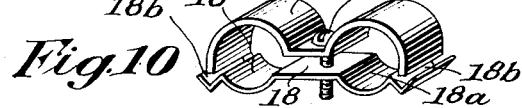
INVENTOR.
Walter H. Bachmann
BY Spear, Rawlings & Spear
ATTORNEYS.

Patented Oct. 6, 1942

2,297,862

UNITED STATES PATENT OFFICE 2,297,862

SWITCH BOX

Walter H. Bachmann, Athol, Mass.

Application August 30, 1939, Serial No. 292,596

2 Claims. (Cl. 220—3.7)

My present invention relates to novel switch or like boxes.

Switch boxes, adapted to be mounted in a wall opening in the wiring of buildings, have been used for a long time. While such boxes have been satisfactory in use, the present structures are objectionable in that their installation has been attended by considerable difficulty, largely attributable to problems involved in anchoring them in the wall. While the problems have always been recognized, the switch boxes widely in use are anchored in place by screws.

In accordance with my invention, I employ flanged male and female members with adjustable means to interlock the members so that their flanges tightly clamp engageable wall portions. By this, I am able to obviate the use of screws and the like while providing a switch box adapted to be quickly and easily installed in any wall structure. Switch boxes, in accordance with my invention, may be inexpensively made and may be embodied in a through wall box providing outlets in two rooms with a saving in materials and labor or it may be embodied as a single box mounted in the wall through only one of its surfaces.

In the accompanying drawings, I have shown embodiments of my invention from which its many novel features and advantages will be readily apparent.

In the drawings:

Fig. 1 is a view illustrating a through wall switch box in accordance with my invention.

Fig. 2 is an enlarged, partly sectioned view of the switch box shown in Fig. 1.

Fig. 3 shows, in perspective, one of the switch box members.

Fig. 4 is a similar view of the other switch box member.

Fig. 5 is a view, similar to Fig. 2, of a modification of my invention.

Fig. 6 shows in perspective one of the members used in the embodiment of my invention shown in Fig. 5.

Fig. 8 is a partly broken away perspective view of a modification of the box member shown in Fig. 3 and adapted to be used with either embodiment of my invention.

Fig. 7 shows the back adapted to be added to the box shown in Fig. 8 when it is to be used in the embodiment of my invention shown in Fig. 5.

Fig. 9 shows the details of construction of my connectors, and

Fig. 10 shows my cable anchoring clip.

At W, I have indicated a typical wall in which cables C are located to establish circuits to lights and the like. Such circuits are frequently controlled by switches enclosed in boxes mounted in openings in the wall W.

In accordance with my invention, the switch box consists of the sections 1 and 2, each of which is formed with flanges 3. The embodiment of my invention shown in Figs. 1–4 is adapted to establish a through wall switch box for two switches S so that a single cable C may be employed to establish a circuit to two rooms.

In this embodiment of my invention, the flanges 3 are identical and are each adapted to receive a plate 4 for a switch S. Preferably, a cover plate 5 is attached to the switch plate 4.

The section 1 as may be most clearly seen in Fig. 3 is formed with conventional knock-outs 6 to establish apertures through the box for the cable C. The knock-outs 6 in the top and bottom walls 7 and 8 of the section 1 are disposed adjacent each edge of these walls and the top and bottom walls 7 and 8 intermediate the knock-outs 6 are formed with a ratchet surface 9.

The section 2, as may be most clearly seen in Fig. 4, is adapted to enter the section 1 and is cut away as at 10 so that it can not block any of the knock-outs 6. The top and bottom walls 11 and 12 of the section 2 are each provided with a pair of parallel slots to establish a resilient tongue 14 presenting a pawl portion 15 shaped to engage with the ratchet surfaces 9 of the section 1 so that the sections 1 and 2 may be assembled in mated position to interlock in clamping relation to engageable portions of the wall W as shown in Figs. 1 and 2.

In all switch boxes made in accordance with my invention, conventional clamps 16 may be located within the section 1 to anchor the cables C in place. The clamps 16 are locked in position by screws 17 threaded through the wall of the section 1. If desired, a base piece 18 may be used shaped as at 18ᵃ to receive the cables C and as at 18ᵇ to receive the ends of the clamps.

In accordance with my invention, I also provide connectors 19 to permit the cables C to be connected quickly and easily to the switches S. The connectors 19 consist of an insulated metal core having soldered thereto wires 19ᵇ to be connected to the switches S. Each of the cores of the connectors 19 receives the end of one of the cable wires which is locked in place by set screw 20.

In Fig. 5 I have shown a modification of my invention in which the switch box is adapted to serve one room only. In such a switch box, I employ a box member 21 having a flange 23 that may be similar in structure and function to the flange 3 of the section 1 shown in Fig. 3. The box 21 has a back 24 having an aperture 25 therein to receive the screw 26. The box 21 is adapted to be used with a clamp 27, which, as shown in Fig. 6, is of thin narrow stock shaped to receive the box 21 and to include end flanges 28. The member 27 is formed with a threaded aperture 29 adapted to receive the screw 26.

In this form of my invention, the member 27 may be inserted in the opening in the wall and by turning the screw 26 the flanges 23 and 28 are drawn together to tightly clamp suitable portions of the wall, as shown in Fig. 5.

In Fig. 8, I have shown a modification of my invention in which one of the box members may be adapted for use with either of the above described modifications of my invention. In this embodiment of my invention, the box 1ᵃ is formed with a detachable top 30. The top 30 and the bottom 30ᵃ are formed with slits 31 to receive the tabs 32 of the back 33. The back 33 has a threaded aperture 25ᵃ to receive the screw 26. In other respects, the box 1ᵃ is similar to the box 1 shown in Fig. 3. By this construction, the box 1ᵃ may be used with the section 2 shown in Fig. 4 without the back 33 or with the addition of the back 33 may be used with the clamp 27.

With switch boxes constructed in accordance with my invention, the boxes may be very quickly installed in the walls and adjusted, as required by the particular wall, so that the flanges of the box sections tightly clamp engageable wall portions.

What I therefore claim and desire to secure by Letters Patent is:

1. In a self-sustaining wall box for switch or like electrical control element, a pair of rectangular members slidably telescoping with each other, oppositely disposed flanges on the edge of the members and adapted to be resiliently clamped across opposite edges of a wall aperture, said members having ratchet surfaces in interengageable alinement for adjustable mutual tensioning of said flanges against the wall when in place, said ratchet surfaces being disposed for interengagement inwardly of the wall box unit assembly, said flanges having means for attachably receiving cover or other plate-like attachment, whereby the box may become a closed chamber within the wall receptive of wiring circuits.

2. A wall box as in claim 1 in which the flange tension ratchet surface interengagement is freely accessible through its open face for ratchet release.

WALTER H. BACHMANN.